US007738981B2

(12) United States Patent
Liu

(10) Patent No.: US 7,738,981 B2
(45) Date of Patent: Jun. 15, 2010

(54) SYSTEM AND METHOD FOR CREATING A MONOPHONIC SPECTRUM SWEEPING WAVE FILE

(75) Inventor: Xiao-Wei Liu, Guangdong (CN)

(73) Assignees: Hong Fu Jin Precision Industry (Shen Zhen) Co., Ltd., Longhua Town, Bao'an District, Shenzhen, Guangdong Province (CN); Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 929 days.

(21) Appl. No.: 11/309,804

(22) Filed: Sep. 29, 2006

(65) Prior Publication Data

US 2007/0121963 A1 May 31, 2007

(30) Foreign Application Priority Data

Nov. 26, 2005 (CN) ........................ 2005 1 0101804

(51) Int. Cl.
*G06F 17/00* (2006.01)
*H04R 29/00* (2006.01)

(52) U.S. Cl. .......................................... 700/94; 381/58

(58) Field of Classification Search ................... 700/94; 381/58, 56; 702/186
See application file for complete search history.

(56) References Cited

U.S. PATENT DOCUMENTS 4,677,674 A * 6/1987 Snyder ........................ 381/58
5,361,305 A * 11/1994 Easley et al. .................. 381/58
5,644,505 A * 7/1997 Soutar et al. .................. 381/58
5,915,029 A * 6/1999 Yazurlo et al. ................ 381/58
5,918,223 A * 6/1999 Blum et al. .................... 707/1
6,538,190 B1 3/2003 Yamada et al.
7,095,455 B2 * 8/2006 Jordan et al. ................ 348/734
2007/0019814 A1 * 1/2007 Chen ........................... 381/56

* cited by examiner

*Primary Examiner*—Curtis Kuntz
*Assistant Examiner*—Hai Phan
(74) *Attorney, Agent, or Firm*—Winston Hsu

(57) ABSTRACT

An exemplary system for creating a monophonic spectrum sweeping wave file includes a parameter receiving module (12), a determining module (14) and a creating module (16). The parameter receiving module is configured for receiving parameters on a monophonic spectrum sweeping wave file to be created. The parameters basically includes a frequency distribution of the monophonic spectrum sweeping wave file as well as other parameters specifying other aspects of the monophonic spectrum sweeping wave file. The determining module is configured for determining the frequency distribution. The creating module is configured for computing a plurality of separated frequencies according to the frequency distribution, generating corresponding wave files having the plurality of separated frequencies respectively, and creating the monophonic spectrum sweeping wave file by linking the wave files linearly in order. A related method is also provided.

19 Claims, 3 Drawing Sheets

SYSTEM AND METHOD FOR CREATING A MONOPHONIC SPECTRUM SWEEPING WAVE FILE

FIELD OF THE INVENTION

The present invention is generally related to audio test systems and methods, and more particularly, to a system and method for creating audio test files.

DESCRIPTION OF RELATED ART

Personal computers, notebook computers, and server computers typically have audio modules (i.e. audio chipsets) configured in motherboards thereof for handling audio signals such as signal inputs, signal conversions, and signal outputs. As known, an audio module includes a digital/analog converter (DAC) for converting analog signals into digital signals known as A-D conversions or digital signals into analog signals known as D-A conversions.

Generally, it is required and important to test the signal conversion function of an audio module. Such tests typically require a test file (i.e. a monophonic spectrum sweeping wave file) with strict restriction on a wave type, a sampling band width, a sampling frequency, a total number of channels, a frequency range, a wave amplitude, and a time duration of playing the monophonic spectrum sweeping wave file for one time, and so on. Also, the test file has to be easily upgraded as the sampling frequency varies in the art. For example, the popular frequency of motherboard may be currently 44.1 KHZ, 48 KHZ, or 96 KHZ, or even 192 KHZ in future.

What is needed, therefore, is a system and method for creating a monophonic spectrum sweeping wave file having specifications on more aspects or parameters, and more flexible and easily upgradable.

SUMMARY OF THE INVENTION

One preferred embodiment provides a system for creating a monophonic spectrum sweeping wave file. The system includes a parameter receiving module, a determining module and a creating module. The parameter receiving module is configured for receiving parameters on a monophonic spectrum sweeping wave file to be created. The parameters basically includes a frequency distribution of the monophonic spectrum sweeping wave file as well as other parameters specifying other aspects of the monophonic spectrum sweeping wave file. The determining module is configured for determining the frequency distribution. The creating module is configured for computing a plurality of separated frequencies according to the frequency distribution, generating corresponding wave files having the plurality of separated frequencies respectively, and creating the monophonic spectrum sweeping wave file by linking the wave files linearly in order.

Another preferred embodiment provides a computer-based method for creating a monophonic spectrum sweeping wave file. The method basically includes the steps of: receiving parameters on a monophonic spectrum sweeping wave file, the parameters comprising a frequency distribution of the monophonic spectrum sweeping wave file; determining the frequency distribution; computing a plurality of separated frequencies according to the parameters; generating corresponding wave files having the plurality of separated frequencies respectively according to the parameters; and creating the monophonic spectrum sweeping wave file by linking the wave files linearly in order.

Other systems, methods, features, and advantages will be or become apparent to one skilled in the art upon examination of the following drawings and detailed description.

DETAILED DESCRIPTION OF THE INVENTION

Figure 1:
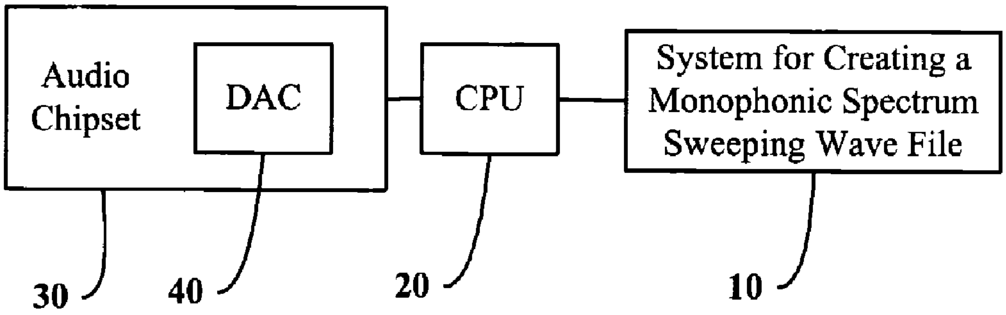
FIG. 1 is a schematic diagram of an application environment of a system for creating a monophonic spectrum sweeping wave file in accordance with one preferred embodiment.

FIG. 1 is a schematic diagram of an application environment of a system for creating a monophonic spectrum sweeping wave file (hereinafter referred to as "the system 10") in accordance with one preferred embodiment. The system 10 is typically installed in a computer (not shown), such as a personal computer, a notebook computer, a server computer and the like, the computer may include a plurality of hardware devices, such as a central processing unit (CPU) 20, a memory, a hard-disk, a monitor, a mouse, and a keyboard (not shown). The program of the system 10 may be stored in the hard-disk, or other types of storage devices.

The computer may further include a motherboard (not shown) that may have an audio chipset 30 (also known as audio module) configured thereon for handling audio signals inputted in, transmitted in, or outputted from the computer. Generally, there are two basic types of audio signals: analog signals and digital signals. As known, a computer can only process digital signals. Thus, analog signals have to be converted into digital signals before processed by the computer.

For audio signal conversions, a digital analog converter (DAC) 40 is configured in the audio chipset 30. The DAC 40 can either convert analog signals into digital signals (a.k.a A-D conversions), or convert digital signals into analog signals (a.k.a D-A conversion). As such, the DAC 40 may perform the A-D conversions when inputting analog signals into the computer, and possibly perform the D-A conversions when outputting digital signals from the computer.

The CPU 20 is configured for data and signal processing in the computer, and further for executing the system 10 from the hard-disk to create monophonic spectrum sweeping wave files. The CPU 20 may further utilize the monophonic spectrum sweeping wave files created to test the functions of the audio chipset 30, especially the DAC 40.

Figure 2:
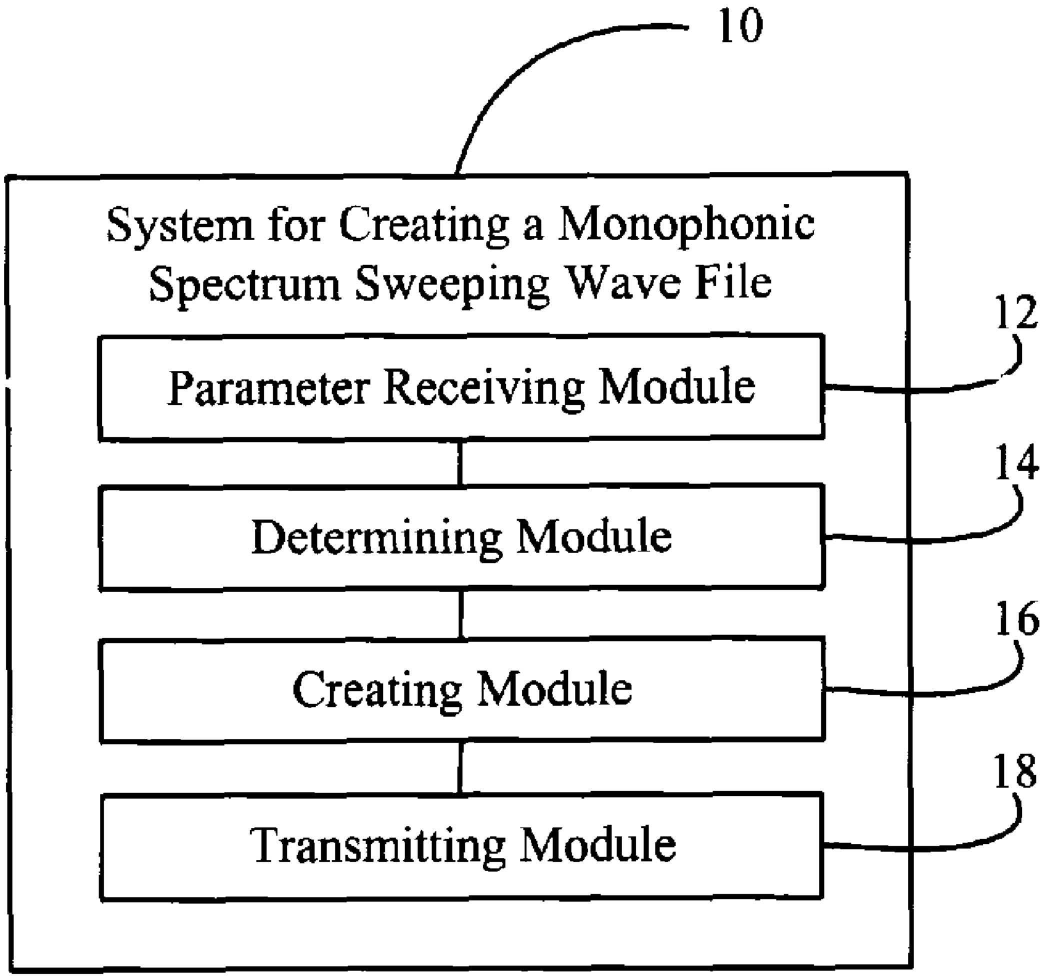
FIG. 2 is a schematic diagram of function modules of the system of FIG. 1.

FIG. 2 is a schematic diagram of function modules of the system 10. The system 10 may basically include a parameter receiving module 12, a determining module 14, a creating module 16, and an transmitting module 18. These modules are described in detail below.

The parameter receiving module 12 is configured for receiving parameters of a monophonic spectrum sweeping wave file to be created. The parameters may include a frequency distribution of the monophonic spectrum sweeping wave file, parameters for a wave type, a sampling band width, a sampling frequency, a total number of channels, a frequency range, a wave amplitude, and a play time of the monophonic spectrum sweeping wave file. Such parameters may be inputted through an input device such as a keyboard of the computer that executes the system 10.

Specifically among the parameters, the frequency distribution of the monophonic spectrum sweeping wave file has two types, a linear distribution and an exponential distribution. The wave type may be a sine wave, a square wave, a triple wave, a ramp wave, or a pulse wave. The sampling band width specifies a band width of digital audio signals converted from analog audio signals, that can be 8 bits, 16 bits, 20 bits, 24 bits, 32 bits, 64 bits, and even 128 bits. The sampling frequency restricts a frequency of the digital audio signals that can be 11 KHZ, 22 KHZ, 44.1 KHZ, 48 KHZ, or 96 KHZ, or even 192 KHZ. The sampling frequency should be set under the Harry Nyquist theory known in the art. The frequency range specifies the frequency range in which the digital audio signals vary. In the preferred embodiment, setting the range between 4 HZ-40 KHZ is good enough for the purpose of creating a monophonic spectrum sweeping wave file to test the audio chipset 30. The wave amplitude specifies the amplitude range in which the digital audio signals vary, maybe 0 dB-60 dB in the preferred embodiment. The play time parameter specifies a length in time for executing of the monophonic spectrum sweeping wave file to test the audio chipset 30, which depends on the requirements.

The determining module 14 is configured for determining the frequency distribution among the parameters. Specifically, the determining module 14 determines whether the frequency distribution is set as the linear distribution or the exponential distribution.

The creating module 16 is configured for creating the monophonic spectrum sweeping wave file.

Specifically, the creating module 16 computes a plurality of separated frequencies according to the frequency distribution determined by the determining module 14. If the frequency distribution is determined as the linear distribution, the creating module 16 performs the computation by invoking a linear function; or if the frequency distribution is determined as the exponential distribution, the creating module 16 performs the computation by invoking an exponential function.

Furthermore, the creating module 16 generates corresponding wave files having the plurality of separated frequencies according to the parameters by invoking a corresponding audio processing library function for a wave file generation, the library function is known as the waveformat function. Each wave file corresponds to a single frequency of the plurality of separated frequencies.

Moreover, the creating module 16 links the wave files linearly in ascending order to create the monophonic spectrum sweeping wave file under the restriction and specification of the parameters received by the parameter receiving module 12. In an alternative embodiment, the wave files are linked linearly in descending order.

The transmitting module 18 is configured for transmitting the monophonic spectrum sweeping wave file to the DAC 40. The CPU 20 executes the monophonic spectrum sweeping wave file to test the DAC 40.

Figure 3:
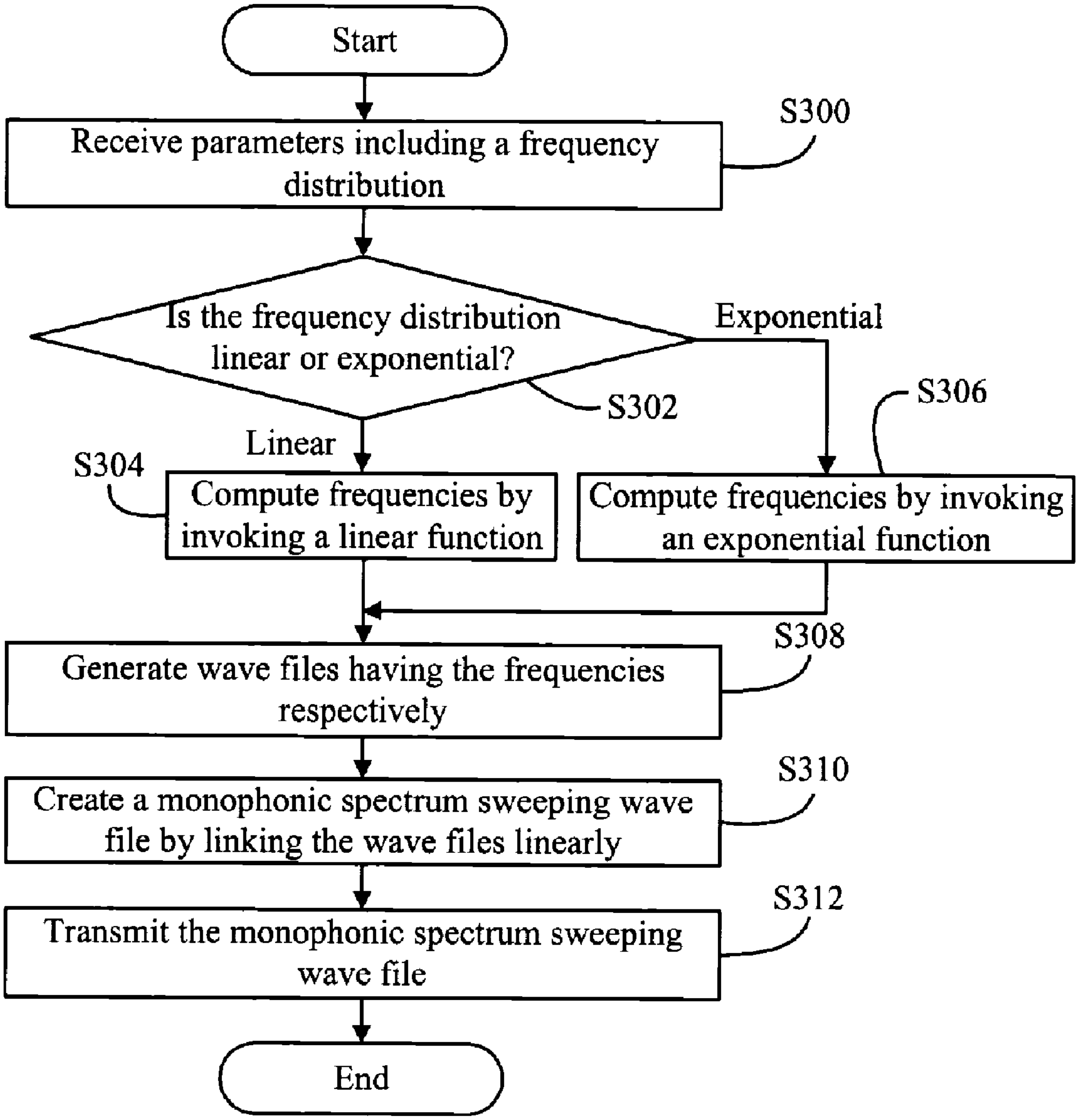
FIG. 3 is a flowchart of a method for creating a monophonic spectrum sweeping wave file in accordance with one preferred embodiment.

FIG. 3 is a flowchart of a method for creating a monophonic spectrum sweeping wave file in accordance with one preferred embodiment. The method can be performed by utilizing the system 10 described above, and is described in steps below.

In step S300, the parameter receiving module 12 receives parameters on a monophonic spectrum sweeping wave file to be created. The parameters may be inputted through an input device such as a keyboard of the computer that executes the system 10. The details for the parameters are described above in paragraphs [0016] and [0017].

In step S302, the determining module 14 determines the frequency distribution. Specifically, the determining module 14 determines whether the frequency distribution is set as the linear distribution or the exponential distribution.

In step S304, the creating module 16 computes the plurality of separated frequencies by invoking the linear function if the frequency distribution is determined to be the linear distribution by the determining module 14 in step S302. Otherwise, if the frequency distribution is determined to be the exponential distribution by the determining module 14 in step S302, the creating module 16 in step S306 computers the plurality of separated frequencies by invoking the exponential function.

In step S308, the creating module 16 generates corresponding wave files, each having the single frequency of the plurality of separated frequencies according to the parameters by invoking the corresponding audio processing library function for the wave file generation, the library function is known as the waveformat function. Each wave file corresponds to one of the separated frequencies.

In step S310, the creating module 16 creates the monophonic spectrum sweeping wave file under the restriction and specification of the parameters received by the parameter receiving module 12 by linking the wave files linearly in ascending order. In an alternative embodiment, the wave files are linked linearly in descending order.

In step S312, the transmitting module 18 transmits the monophonic spectrum sweeping wave file into the DAC 40. The CPU 20 executes the monophonic spectrum sweeping wave file to test the DAC 40.

It should be emphasized that the above-described embodiments of the preferred embodiments, particularly, any "preferred" embodiments, are merely possible examples of implementations, merely set forth for a clear understanding of the principles of the invention. Many variations and modifications may be made to the above-described preferred embodiment(s) without departing substantially from the spirit and principles of the invention. All such modifications and variations are intended to be included herein within the scope of this disclosure and the above-described preferred embodiment(s) and protected by the following claims.

What is claimed is:

1. A system for creating a monophonic spectrum sweeping wave file, the system comprising:

a parameter receiving module configured for receiving parameters on a monophonic spectrum sweeping wave file input through an input device, the parameters comprising a frequency distribution of the monophonic spectrum sweeping wave file and a play time specifying a duration for executing the monophonic spectrum sweeping wave file to test an audio chipset of a computer;

a determining module configured for determining a type of the frequency distribution;

a creating module configured for computing a plurality of separated frequencies according to the frequency distribution, generating corresponding wave files having the plurality of separated frequencies according to the parameters, and creating the monophonic spectrum sweeping wave file by linking the wave files linearly in order;

a transmitting module configured for transmitting the monophonic spectrum sweeping wave file to the audio chipset; and a central processing unit that executes the parameter receiving module, the determining module, the creating module, and the transmitting module to create the monophonic spectrum sweeping wave file, and further executes the monophonic spectrum sweeping wave file according to the parameters to test functions of the audio chip set.

2. The system according to claim 1, wherein the parameters further comprise a wave type, a sampling band width, a sampling frequency, a total number of channels, a frequency range, and a wave amplitude.

3. The system according to claim 1, wherein the plurality of separated frequencies are computed by invoking a corresponding function selected from the group consisting of a linear function and an exponential function.

4. The system according to claim 1, wherein the wave files are generated by invoking an audio processing library function.

5. The system according to claim 1, wherein the type of the frequency distribution is selected from the group consisting of a linear distribution and an exponential distribution.

6. The system according to claim 1, wherein the wave files are linked linearly in descending order.

7. The system according to claim 1, wherein the wave files are linked linearly in ascending order.

8. The system according to claim 2, wherein the sampling band width specifies a band width of digital audio signals converted from analog audio signals.

9. The system according to claim 2, wherein the sampling frequency restricts a frequency of the digital audio signals.

10. The system according to claim 2, wherein the frequency range specifies the frequency range in which the digital audio signals vary.

11. The system according to claim 2, wherein the wave amplitude specifies the amplitude range in which the digital audio signals vary.

12. A computer-based method for creating a monophonic spectrum sweeping wave file, the method being performed by execution of non-transitory computer readable medium program code by a central processing unit of a computer, comprising the steps of:

receiving parameters on a monophonic spectrum sweeping wave file input through an input device using the central processing unit, the parameters comprising a frequency distribution of the monophonic spectrum sweeping wave file and a play time specifying a duration for executing the monophonic spectrum sweeping wave file to test an audio chipset;

determining a type of the frequency distribution using the central processing unit;

computing a plurality of separated frequencies according to the parameters using the central processing unit;

generating corresponding wave files having the plurality of separated frequencies according to the parameters using the central processing unit;

creating the monophonic spectrum sweeping wave file by linking the wave files linearly in order using the central processing unit;

transmitting the monophonic spectrum sweeping wave file to the audio chipset using the central processing unit; and executing the monophonic spectrum sweeping wave file according to the parameters of the monophonic spectrum sweeping wave file using the central processing unit, to test functions of the audio chipset.

13. The method according to claim 12, wherein the parameters further comprise a wave type, a sampling band width, a sampling frequency, a total number of channels, a frequency range, and a wave amplitude.

14. The method according to claim 12, wherein the wave files are generated by invoking an audio processing library function.

15. The method according to claim 12, wherein the type of the frequency distribution is selected from the group consisting of a linear distribution and an exponential distribution.

16. The method according to claim 15, wherein the computing step comprises invoking a linear function for computing the separated frequencies if the frequency distribution is determined as a linear distribution.

17. The method according to claim 15, wherein the computing step comprises invoking an exponential function for computing the separated frequencies if the frequency distribution is determined as an exponential distribution.

18. The method according to claim 12, wherein the wave files are linked linearly in descending order.

19. The method according to claim 12, wherein the wave files are linked linearly in ascending order.

* * * * *